March 13, 1934.  C. L. JOHNSON  1,950,493
SPARE WHEEL AND TIRE LOCK
Filed April 9, 1928  2 Sheets-Sheet 1

INVENTOR
Colvin L. Johnson.
By Ralph Reich
ATTORNEY

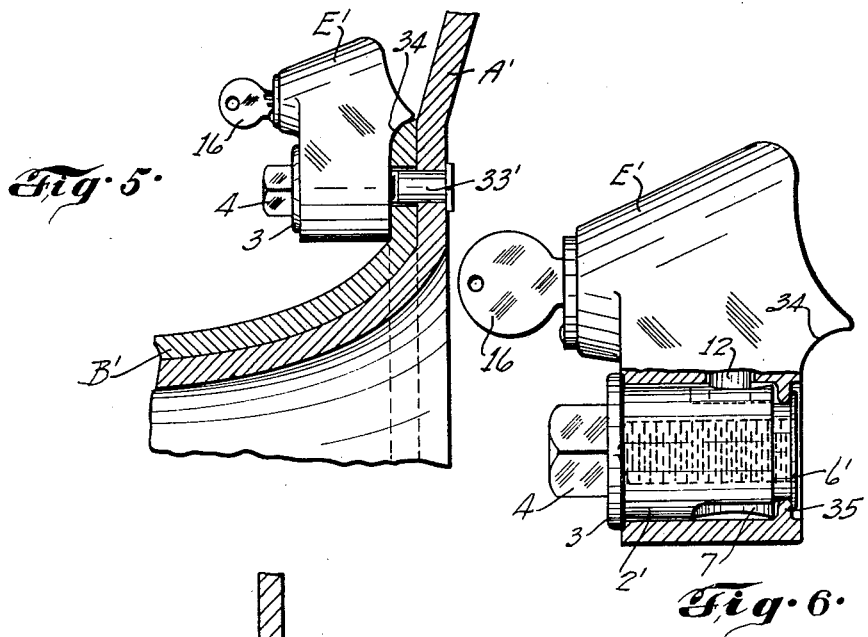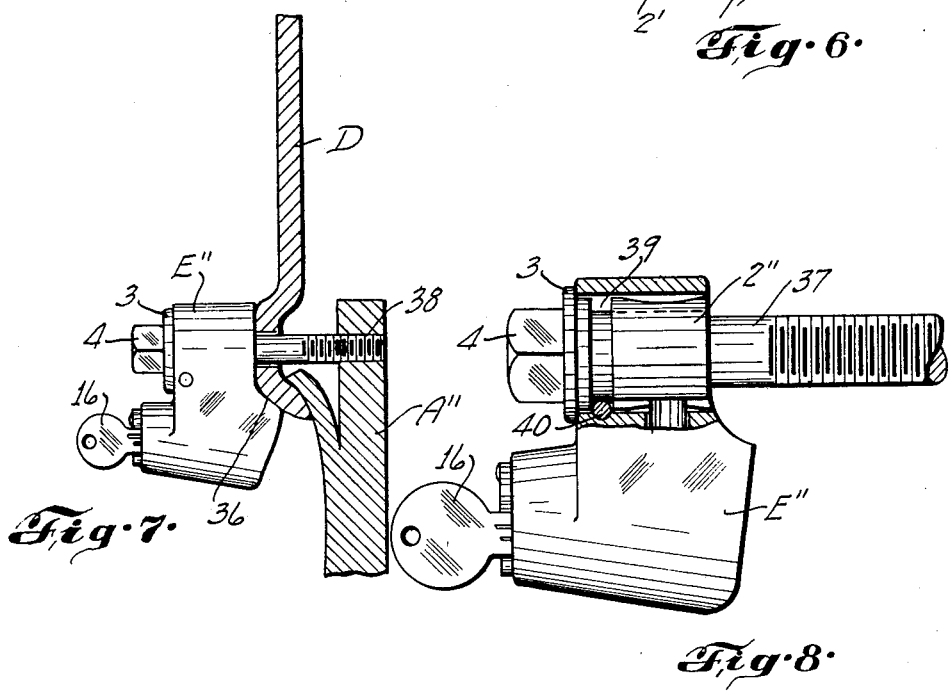

Patented Mar. 13, 1934

1,950,493

UNITED STATES PATENT OFFICE 1,950,493

SPARE WHEEL AND TIRE LOCK

Colvin L. Johnson, St. Louis, Mo., assignor, by mesne assignments, to Duro Metal Products Company, Chicago, Ill., a corporation of Illinois Application April 9, 1928, Serial No. 268,622

1 Claim. (Cl. 70—90)

This invention relates generally to locks and, more particularly, to a certain new and useful improvement in devices especially adapted for locking against unauthorized removal, certain automobile spare-parts, such, for instance, as the spare wheel and spare-tire.

My invention has for its objects the provision of a device for the purpose stated which is compact in structure, conveniently operable, and efficient in the performance of its intended functions.

And with the above and other objects in view, my invention resides in the novel features of form, construction, arrangement, and combination of parts hereinafter described and pointed out in the claim.

In the accompanying drawings,—

Figure 5 illustrates the lock in side elevation as modified for use especially with spare wire-wheels;

Figure 6 is an enlarged elevational view, partly in section, of the lock of Figure 5;

Figure 7 illustrates the lock in side elevation as further modified for use especially with disk-wheels; and Figure 8 is an enlarged elevational view, partly in section, of the lock of Figure 7.

Figure 1:
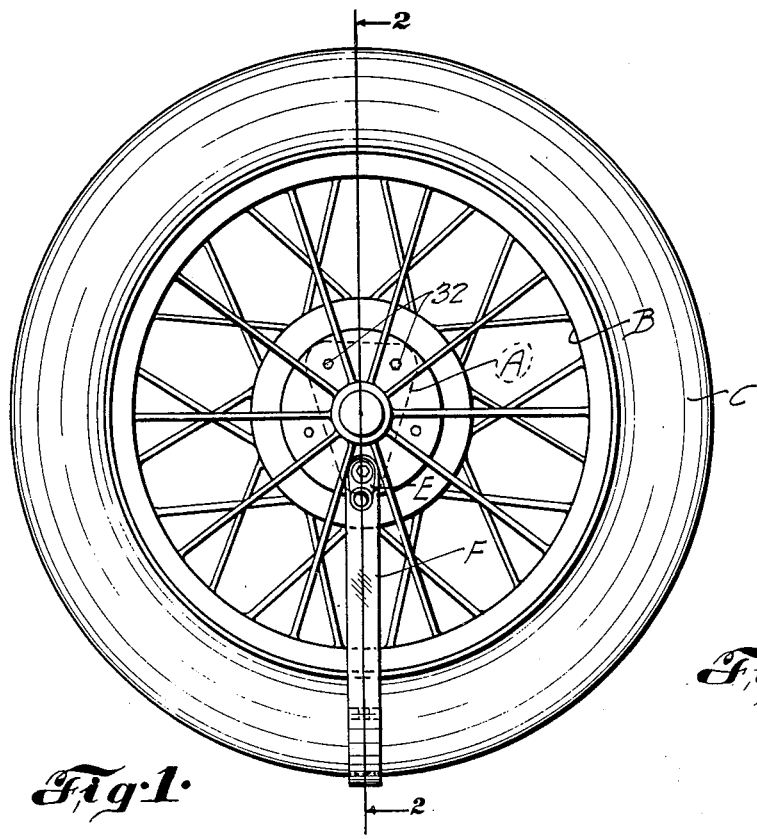
Figure 1 is an elevational view of a spare-wheel and its tire, illustrating a lock of my invention operatively associated therewith, the wheel-carrier being shown in dotted lines.

Referring now more in detail and by reference characters to the accompanying drawings, which illustrate practical embodiments of my invention, my new lock is designed for use in connection with the demountable or spare-wheel and its carrier.

Figure 2:
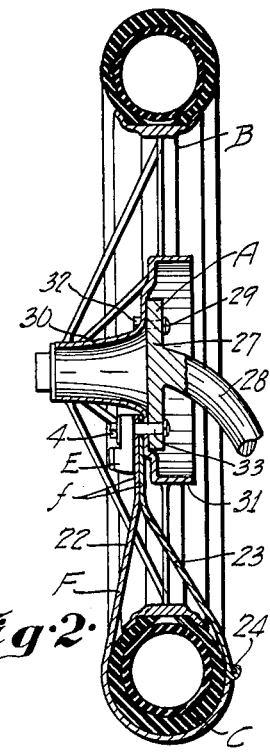
Figure 2 is a sectional view taken approximately on the line 2—2, Figure 1.
Figure 3:
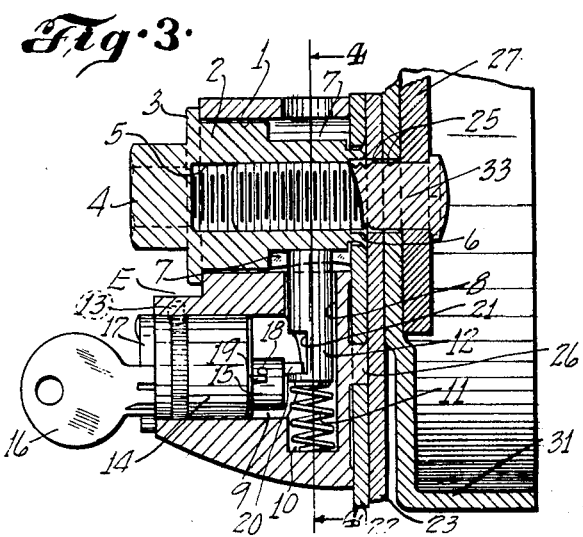
Figure 3 is an enlarged fragmental sectional view, showing details of the locking-assembly and portions of the associated parts.
Figure 4:
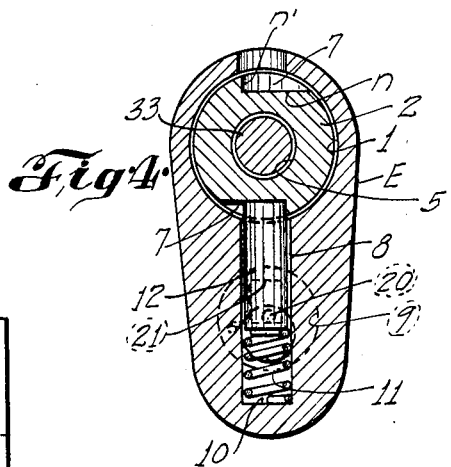
Figure 4 is a sectional view taken approximately on the line 4—4, Figure 3.

The form of the lock shown in Figures 1 to 4, both inclusive, is adapted for simultaneously locking to the carrier A both the spare-wheel B and its tire C, and with reference first to such combined form of the lock, the locking-assembly includes a block E provided transversely or horizontally with a bore 1, which extends from the outer or rear face to the inner or front face of block E and in which, as best seen in Figure 4, is arranged for bodily rotatory movement a barrel 2, conjoined to which adjacent its one or rear end is a collar 3 adapted for barrel-retaining engagement with the outer face of the block E, as shown. Rearwardly of collar 3 and preferably integral with or otherwise rigidly conjoined to barrel 2, is an actuating head 4 preferably of hexagonal or other suitable form for wrench-engagement. Formed longitudinally in the barrel 2 and opening only to the inner or forward face of block E, is an internally threaded elongated or bolt-accommodating recess 5. For purposes later appearing, barrel 2 has a reduced extension 6 registering with and at the open end of recess 5, and formed peripherally on and at the forward portion of barrel 2, is a plurality of ratchet-notches 7, two such notches being shown spaced diametrically of the barrel and each having a cam face $n$ and a shoulder $n'$.

Also formed in block E, is a longitudinally or vertically disposed reduced bore 8, which opens at its one or upper end into the bore 1 and at its other or lower end into an enlarged cylindrical recess 9 disposed transversely or horizontally in block E below (reference being had to Figure 3) and extending in parallelism with bore 1, recess 9, however, for purposes soon to appear, opening only on the rearward outer face of block E. Opening into the recess 9 and aligning with the bore 8, is a seat 10 for a spring 11, and disposed on the spring 11 and in the bore 8, with the latter as its guide or way, is a shiftable bolt or pawl 12 adapted yieldingly, under the tension of spring 11, for engagement at its one or upper end with the barrel 2 at its respective ratchet-notches 7 for preventing rotatory movement of the barrel 2 in one direction, namely, the direction faced by the shoulders $n'$.

Disposed in the recess 9 and pinned, as at 13, or otherwise fixed to block E against removal, is a preferably cylindrical lock-block 14, mounted for rotatory movement in which is a cylindrical member or barrel 15 adapted only for rotatory actuation, as is customary in such locks, by means of a key 16 insertable into the cylinder 15, the key-opening (not shown) being normally closed or covered against the entrance of dust or the like by the usual pivotally attached member 17. The barrel 15 at its inner end projects forwardly within block E and beyond the body of the block 14, as clearly seen in Figure 3, and has a laterally extending pin 18 adapted to engage a stop 19 projecting longitudinally from the fixed block 14 to prevent a complete rotation of cylinder or barrel 15 by the key 16; and projecting from the forward end of barrel 15, is a longitudinally disposed and axially offset crank-pin 20 adapted to fit and work in a slot 21 provided in the lower side-portion of the spring-pressed bolt 12, the axial width of which slot is sufficient to permit depression of the bolt 12 by the barrel 2 in riding thereover either when key-depressed, as shortly appears, or when rotated in the direction opposite to that faced by the notches 7, for purposes soon to appear.

Forming part of this form of the lock, is a tire-engaging member F constructed preferably of strap-iron and which is of loop-like form for embracing the rim of the wheel B and the tire C, the member F comprising an outer leg 22 and an inner leg 23 hingedly attached together at contiguous ends, as at 24. At their opposite ends, the legs 22, 23, terminate in flat portions f, f, adapted for abutting lapwise registration when the member F is in tire engagement, and each flat leg-portion f having a transverse bolt-opening or eye, as at 25, likewise adapted for registration when the member F is operatively in tire engagement. Upon the outer face of the flat portion f of the one strap 22 of member F, the block E of the locking assembly is at its inner face flatwise disposed, and upon which strap the block E is rigidly and permanently fixed as by means of an integral stud 26 projecting from the block E and through the strap and clinched or otherwise upset thereupon, as best seen in Figure 3. It will be noted that the extension 6 of barrel 2 is projected forwardly through the eye 25 of strap 22 and then upset upon the strap 22 in such manner that, while barrel 2 is freely rotatable relatively to the block E and member F, the barrel 2 is permanently retained from rearward movement in or removal from block E, the collar 3, in its engagement with the block E, while also permitting free rotatory movement of barrel 2 in block E, retaining the same from forward movement in or removal from the block E.

Normally, as when the key 16 is removed from the lock-cylinder 15, the bolt 12 yieldingly engages the barrel 2 at one or the other of its notches 7 and prevents rotatory movement of barrel 2 in the direction, as stated, faced by the shoulders n' or, as it might be said, in the direction that would unscrew or unfasten the barrel 2 from threaded engagement with a bolt fitted into its recess 5. However, by means of a wrench or other suitable tool (not shown) applied upon the barrel-head 4, the barrel 2 may be rotorily actuated in a screwing or fastening direction, upon an interposed bolt, that is to say, in the direction opposite to that faced by the shoulders n', the bolt 12 being successively depressed against the tension of spring 11, by the cam-faces n of the several notches 7 and the barrel 2 riding thereover, the slot 21 being, as stated, of sufficient length or width to permit such successive depression of the bolt 12 when not key-actuated. On a key 16 being inserted in the block 14 and the barrel 15 then rotorily actuated, the bolt 12 will be pulled by the crank-pin 20 and against the tension of the spring 11 out of engagement with the barrel 2, when the barrel 2 may be freely rotated in a so-called non-screwing, release, or unfastening direction.

The carrier C includes a plate 27 fixed on a bracket 28 mounted on the automobile (not shown). The plate 27 is equipped with a plurality of bolts 29, the threaded ends of which project rearwardly or outwardly. In the wheel B, the hub 30 is shown as integral with the brake-drum 31 and has a plurality of apertures, some of which, in mounting the wheel B on the carrier C, will register with and receive the bolts 29, when the wheel is detachably secured to the carrier by means of common nuts 32 threaded on the bolts 29. My new lock is then employed to retain the wheel B and its tire C against unauthorized removal, and in use and operation, the member F is first manipulated to embrace both the rim of the wheel B and its tire C and the free end of its hinged strap 23 fitted at its eye 25 upon a bolt 33 also projected through the plate 27 of the carrier A, but preferably of somewhat greater length than the usual bolts 29. The other strap 22 of member F, which strap directly carries the lock-assembly, is then disposed with its end-portion f flatwise upon the so engaged end-portion f of the strap 22, and the barrel 2 then rotorily actuated in a direction opposite to that faced by the ratchet-shoulders n' to threadedly engage the bolt 33, movement of the barrel 2 in such direction being permitted without the interposition of a key 16. In such manner, the wheel B and its tire C are simultaneously locked to and upon the carrier A, release or unfastening movement of barrel 2 being prevented by the engagement of bolt 12 with one or the other of its notches 7. On the bolt 12 being pulled out of engagement with the barrel 2 by means of the crank-pin 20 on actuation thereof by an inserted key 16, the barrel 2 may be reversely rotated and thereby unscrewed from the bolt 33 to free the wheel B and its tire C, when the straps of member F may be hingedly disengaged from the bolt 33 and the wheel B detached. I may add that the locking-assembly is of such type that the key 16 may not be withdrawn from the cylinder 15 when the pin 20 is in bolt unlocking position, with the result that, as an element of safety, the operator is advised that, when they key 16 is removable, the ratchet-mechanism is in operative locking condition.

The modified form of the lock shown in Figures 5 and 6 is especially adapted for use in connection with a different type of wire-wheel and carrier than are shown in Figures 1, 2, and 3. In this form, the carrier A' is constructed to more or less embrace the hub of wheel B', as shown, and is suitably equipped with a mounting bolt 33' whose threaded end is projected rearwardly and whose head is suitably concealed and rendered inaccessible by the body of the automobile (not shown). In this form of the lock, I dispense with the tire-engaging member F and construct the inner face of the lock-assembly block E' with an arcuate face, as at 34, so as to snugly fit upon and engage the hub of the wheel B' when and as the barrel 2' is threaded upon the bolt 33'. I might state further that, in this form of the lock, the barrel 2' has a similar reduced elongation 6' which is loosely upset, as shown, over an internal annular shoulder 35 on the block E' to retain the barrel 2', in co-operation with collar 3, from endwise movement in or removal from the block E'.

The other modified form of the lock shown in Figures 7 and 8 is especially adapted for use in connection with disk-wheels, such as the wheel D, and its carrier A". In this form of the lock, the block E" of the lock-assembly is similarly provided with an arcuate face 36 to snugly fit upon and engage with the hub of the wheel, as shown, while the barrel 2', instead of being internally recessed and threaded for engagement as described with a carrier mounting-bolt, is of solid construction and formed with a threaded or bolt extension 37 which is adapted to screw into a threaded opening 38 provided for the purpose in the carrier A''. And further in this form of the lock, the barrel 2'' is formed adjacent the collar 3 with a circumferential recess 39, with the walls of which a pin 40 driven into the block E'' engages to retain the barrel 2'', in co-operation with collar 3, from endwise movement in or removal from the block E''.

My lock may be readily commercially manufactured and has been found exceedingly efficient in the performance of its intended functions.

I am aware that changes in the form, construction, arrangement, and combination of the several parts of my new lock may be made and substituted for those herein shown and described without departing from the nature and principle of my invention.

Having thus described my invention, what I claim and desire to secure by Letters Patent is:

In a wheel and tire lock the combination of a false hub constituting a spare wheel support, a spoked wheel and tire assembly including a wheel hub, means for securing the wheel hub to the false hub including a stud carried by the false hub and passing through the wheel hub, a strap arranged radially of the wheel encircling the tire and rim, passing between the spokes and hinged adjacent the tire, and having its two ends brought together into parallel relation in the plane of the tire, holes in the strap ends through which the stud passes, a threaded nut for co-acting with the free end of the stud to clamp the free ends of the strap flatwise together and against the wheel hub and at the same time to clamp the wheel hub against the false hub, and a lock comprising a body carried by the outer of the strap ends and embracing the nut and a cylinder lock controlled bolt carried in the body for releasably engaging the nut.

COLVIN L. JOHNSON.